(No Model.)
C. W. ANDERSON.
TREE PROTECTOR.
No. 536,982.                        Patented Apr. 2, 1895.
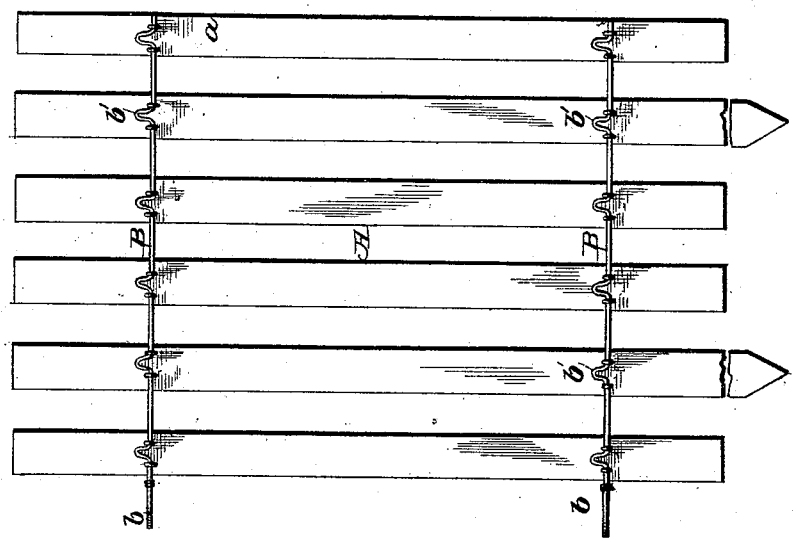
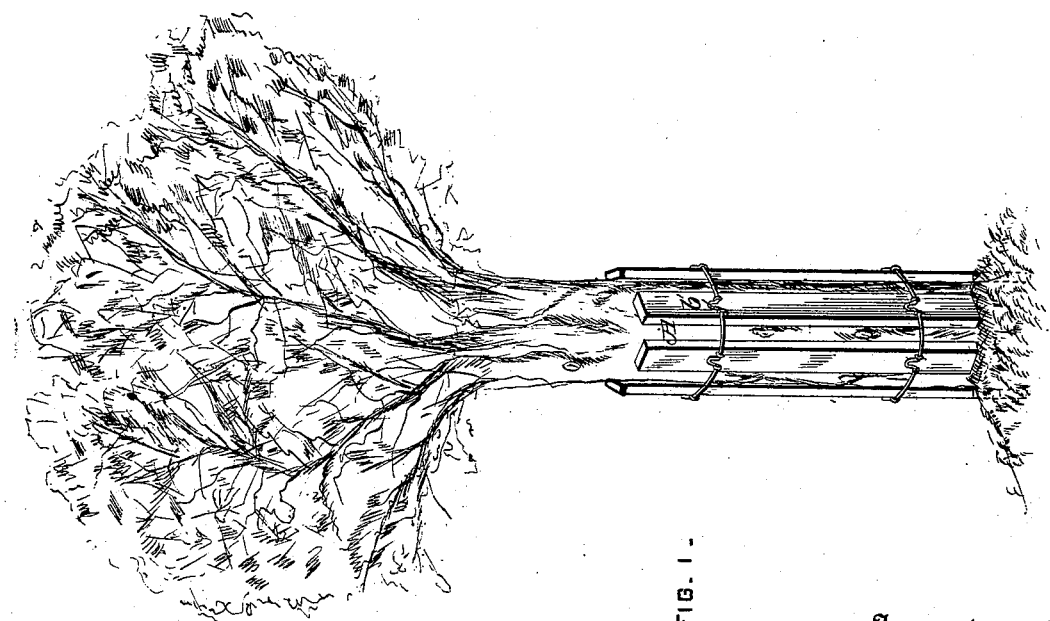
Witnesses
                           Inventor
                           Charles W. Anderson
                           by John Wedderburn
                           Attorney

UNITED STATES PATENT OFFICE.

CHARLES WILLIAM ANDERSON, OF LOS ANGELES, CALIFORNIA.

TREE-PROTECTOR.

SPECIFICATION forming part of Letters Patent No. 536,982, dated April 2, 1895.

Application filed May 25, 1893. Renewed February 26, 1895. Serial No. 540,074. (No model.)

*To all whom it may concern:*

Be it known that I, CHARLES WILLIAM ANDERSON, of Los Angeles, in the county of Los Angeles and State of California, have invented certain new and useful Improvements in Tree-Protectors; and I do hereby declare the following to be a full, clear, and exact description of the invention, such as will enable others skilled in the art to which it appertains to make and use the same.

This invention relates to an improved tree and plant protector, the object of my invention being to provide an exceedingly cheap and simple protector for young trees, which protector can be easily set up or taken down, and one which will protect the trees from heat, animals, and contact with other objects.

With these objects in view; my invention consists in the detailed construction of the various parts, and their novel combination or arrangement, all of which will be fully described and claimed.

In the drawings hereunto annexed, Figure 1, is a perspective view of the protector as applied and used, and Fig. 2, is an elevation of the protector detached and spread out.

In constructing my improved protector, I employ a series of pickets A, which may be of any suitable length, and two or more of them are made longer than the others, and are pointed to be driven into the earth. The pickets are arranged in parallel relation, and are connected with one another by means of two strands of wire B, B, said strands being stapled to the pickets, as clearly shown.

One end of each strand is connected to one end of picket $a$, while the opposite end of the strand is formed into a loop $b$, which is adapted to fit over the end of the picket $a$. The strands are crimped as at $b'$ and the staples driven on opposite sides of said crimps.

The parts are first assembled as shown in Fig. 2, and are then bent around the tree to be protected. The lower loop is then placed over the lower end of picket $a$, and the upper loop over the upper end of said picket, thus producing a circular protector. The pointed pickets are then driven into the earth, and the device is thus set up around the tree, to be protected.

Having thus described my invention, what I claim is—

In a tree protector the combination of pickets, two or more of which are extended at the lower ends and each having pairs of staples contiguously arranged at their upper and lower portions in parallel lines, and upper and lower wire strands having a series of loops intermediate of the ends thereof arranged at intervals each one of said loops being between each pair of staples on the pickets and also having loops formed at their ends, substantially as and for the purposes set forth.

In testimony whereof I have signed this specification in the presence of two subscribing witnesses.

CHARLES WILLIAM ANDERSON.

Witnesses:
FRANK. U. MULRYNE,
HENRY J. ANDREA.